(12) United States Patent
Perozo et al.

(10) Patent No.: US 8,370,541 B2
(45) Date of Patent: *Feb. 5, 2013

(54) METHOD AND SYSTEM FOR PROCESSING FRAMES IN STORAGE CONTROLLERS

(75) Inventors: Angel G. Perozo, Mission Viejo, CA (US); William W. Dennin, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,806

(22) Filed: Sep. 21, 2010

(65) Prior Publication Data

US 2011/0022758 A1    Jan. 27, 2011

Related U.S. Application Data

(63) Continuation of application No. 10/989,060, filed on Nov. 15, 2004, now Pat. No. 7,802,026.

(51) Int. Cl.
    *G06F 3/00* (2006.01)
(52) U.S. Cl. .......................... 710/29; 370/412
(58) Field of Classification Search ................ 710/29
    See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,374,415 A * | 2/1983 | Cormier et al. ............ 710/59 |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |

(Continued)

FOREIGN PATENT DOCUMENTS

| | | |
|---|---|---|
| EP | 0528273 | 2/1993 |
| EP | 0622726 | 11/1994 |

(Continued)

OTHER PUBLICATIONS

PCT International Search Report, Doc. No. PCT/US00/15084, Dated Nov. 15, 2000, 2 pages.

(Continued)

*Primary Examiner* — Elias Mamo

(57) ABSTRACT

A storage drive system including an interface and a channel. The interface is configured to i) receive frames from a host and ii) process the frames. The channel is configured to i) receive the frames from the interface and ii) transfer the frames from the interface to a buffer memory. The channel includes a first register configured to store bit values corresponding to frame processing, and includes a first module configured to i) detect frame types of the frames and ii) in response to detecting a first frame type, stop receiving a second frame type while selectively continuing to receive a third frame type based on the bit values.

16 Claims, 5 Drawing Sheets

U.S. PATENT DOCUMENTS

| | | | |
|---|---|---|---|
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,559,963 A * | 9/1996 | Gregg et al. ............ 709/234 |
| 5,559,988 A | 9/1996 | Durante et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook et al. |
| 5,602,857 A | 2/1997 | Zook et al. |
| 5,613,163 A | 3/1997 | Marron et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman |
| 5,745,488 A * | 4/1998 | Thompson et al. ...... 370/395.31 |
| 5,745,793 A | 4/1998 | Atsatt et al. |
| 5,754,759 A | 5/1998 | Clarke et al. |
| 5,758,188 A | 5/1998 | Applebaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,275 A | 11/1999 | Ecclesine |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,157,984 A | 12/2000 | Fisher |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,647 B1 | 4/2002 | Darnell et al. |
| 6,381,659 B2 | 4/2002 | Proch et al. |
| 6,401,149 B1 | 6/2002 | Dennin et al. |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,530,000 B1 | 3/2003 | Krantz et al. |
| 6,574,676 B1 | 6/2003 | Megiddo |
| 6,609,180 B2 | 8/2003 | Sanada et al. |
| 6,615,305 B1 | 9/2003 | Olesen et al. |
| 6,662,334 B1 | 12/2003 | Stenfort |
| 6,826,650 B1 | 11/2004 | Krantz et al. |
| 7,099,962 B2 | 8/2006 | Nakayama et al. |
| 2001/0044873 A1 | 11/2001 | Wilson et al. |
| 2003/0037225 A1 | 2/2003 | Deng et al. |
| 2003/0172220 A1 * | 9/2003 | Hao ............................ 710/305 |

FOREIGN PATENT DOCUMENTS

| | | |
|---|---|---|
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1988 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for Faster Access", System Design ASIC & EDA, pp. 24-34 (Nov. 1993).

P.M. Bland et al. Shared Storage Bus Circuitry, IBM Technical Disclosure Bulletin, vol. 25, No. 4, Sep. 1982, pp. 2223-2224.

PCT Search Report for PCT/US00/07780 mailed Aug. 2, 2000, 4 pages.

PCT Search Report for PCT/US01/22404, mailed Jan. 29, 2003, 4 pages.

* cited by examiner

METHOD AND SYSTEM FOR PROCESSING FRAMES IN STORAGE CONTROLLERS

CROSS-REFERENCE TO RELATED APPLICATIONS

This application is a continuation of U.S. patent application Ser. No. 10/989,060 filed on Nov. 15, 2004. The disclosure of the above application is incorporated herein by reference in its entirety.

BACKGROUND OF THE INVENTION

1. Field of the Invention

The present invention relates generally to storage device controllers, and more particularly, to processing frames.

2. Background

Conventional computer systems typically include several functional components. These components may include a central processing unit (CPU), main memory, input/output ("I/O") devices, and streaming storage devices (for example, tape drives).

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory. Buffer memory may be a Synchronous Dynamic Random access Memory ("SDRAM"), or Double Data Rate-Synchronous Dynamic Random Access Memory (referred to as "DDR" or "SDRAM")).

Storage controllers use various standards to move data frames in and out of storage devices. One such standard is the Fibre Channel standard. Fibre channel (incorporated herein by reference in its entirety) is an American National Standard Institute (ANSI) set of standards, which provides a serial transmission protocol for storage and network protocols such as HIPPI, SCSI, IP, ATM and others.

A storage controller may receive various types of frames, for example, data, link or command frames. Task management requests ("TMRs") per the Fibre Channel protocol, provide an option to take action for a command thread that may be residing in buffer memory of the storage controller. A TMR is a command frame that includes task management flags. If a command buffer is full, then the TMR may also be encoded as a link frame.

Some conventional storage controllers store data, link, command and TMRS in sequential order and execute and process them as they are being received. This approach has disadvantages because it results in latency and delays.

Conventional storage systems may also use a timer to evaluate, execute and flush command frames from a queue. This requires additional logic and makes the process complex and expensive.

Therefore, there is a need for a system and method that can efficiently handle command frames and TMRS.

SUMMARY OF THE INVENTION

A storage controller is provided in one aspect of the present invention. The storage controller includes a frame snooper module that detects a task management request ("TMR") and generates a pause signal to a channel that stops the channel from sending any non-data frames to a buffer memory, wherein the channel continues to receive and process data frames while the channel is stopped from sending the non-data frames to the buffer memory; a counter for counting TMRS; and logic for generating an interrupt if a number of TMRS received exceeds a certain threshold value.

In yet another aspect of the present invention, a method for processing frames is provided. The method includes detecting a TMR generating a command to stop a channel from receiving non-data frames while continuing to receive data frames from a Fibre Channel interface; and generating an interrupt to a processor after a certain number of TMRs are received.

In yet another aspect of the present invention, a system for transferring data between a computing system and a storage device is provided. The system includes a storage controller including a frame snooper module that detects a TMR and generates a pause signal to a channel that stops the channel from sending any non-data frames to a buffer memory, wherein the channel continues to receive and process data frames while the channel is stopped from sending the command frames to the buffer memory; a counter for counting TMRs; and logic for generating an interrupt if a number of TMRs received exceeds a certain threshold value.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
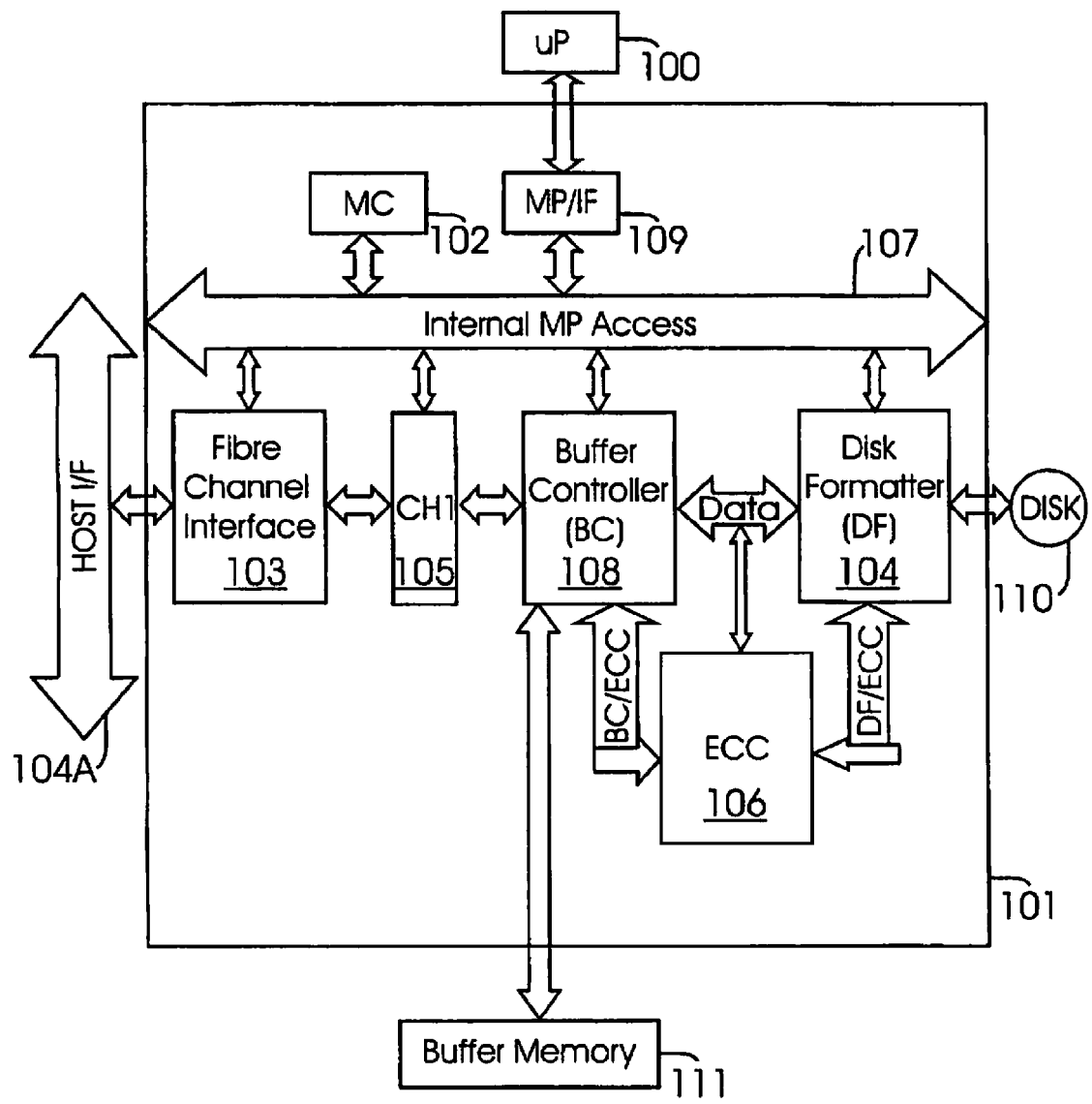
FIG. 1A is an example of a storage system having a storage controller according to one aspect of the present invention.

The system of FIG. 1A is an example of a storage drive system (with an optical disk or tape drive), included in (or coupled to) a computer system. The host computer (not shown) and the storage device 110 (also referred to herein as disk 110) communicate via a port using a disk formatter "DF" 104. Storage device 110 may be connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor (may also be referred to as "MP") 100. Interface 109 serves to couple microprocessor bus 107 to microprocessor 100 and a micro-controller (may also be referred to as "MC") 102.

Controller 101 can be an integrated circuit (IC) that comprises of various functional modules, which provide for the writing and reading of data stored on storage device 110. Microprocessor 100 is coupled to controller 101 via interface 109 to facilitate transfer of data, address, timing and control information.

A read only memory ("ROM") omitted from the drawing is used to store firmware code executed by microprocessor 100.

Fibre Channel interface 103 interfaces with host interface 104A and processes Fibre Channel frames. The frames received by Fibre Channel Interface 103 are sent to Channel 1 (CH1) 105 and then to buffer memory 111 via a buffer controller (also referred to as BC) 108. CH1 105 is a channel that is used for transferring frames/information from Fibre Channel interface 103 to BC 108.

BC 108 connects buffer memory 111 to CH1 105, error correction code ("ECC") module 106 and to bus 107. BC 108 regulates data movement into and out of buffer memory 111. ECC module 106 generates the ECC that is saved on disk 110 writes and provides correction mask to BC 108 for disk 110 read operation.

Figure 1B:
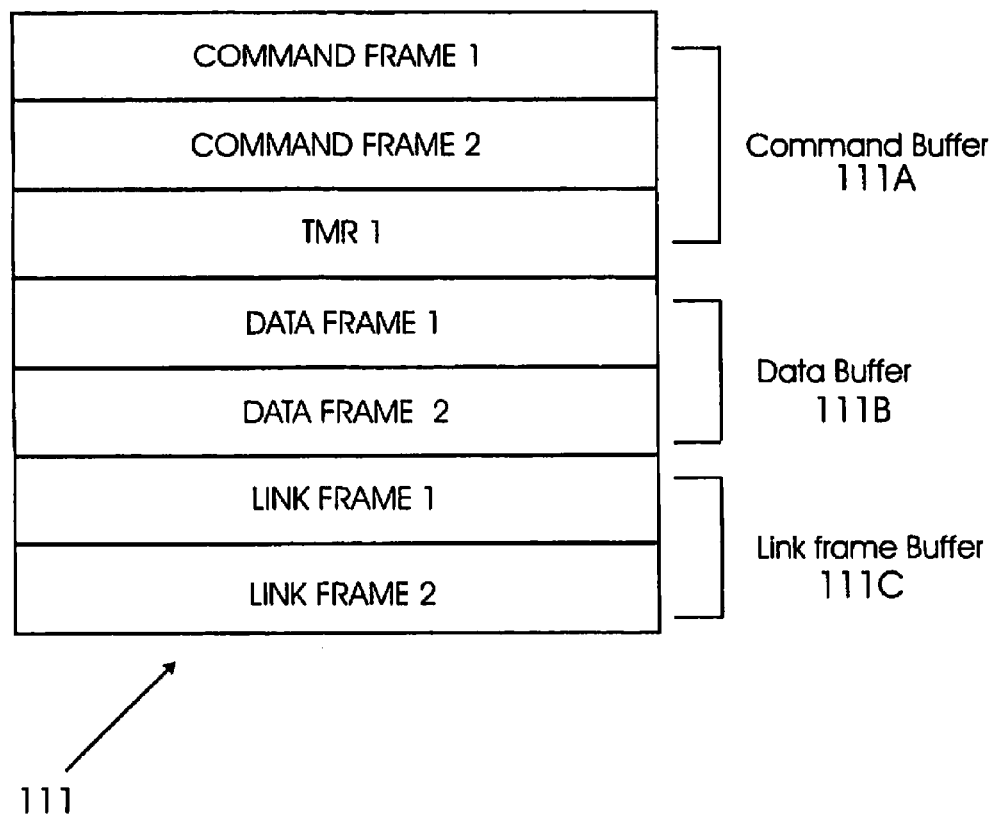
FIG. 1B shows a layout of a buffer memory for storing command, data and link frames, and TMRs, according to one aspect of the present invention.

Buffer memory 111 is coupled to controller 101 via ports to facilitate transfer of data, timing and address information. Buffer memory 111 may be a DDR or SDRAM or any other type of memory. FIG. 1B shows a layout of buffer memory 111 for storing command, data, link frames and TMRs. Command frames containing TMRs are stored in command buffer 111A. Link frames are stored in link buffer 111C and data frames are stored in data buffer 111B. Command frames containing TMRs may also be stored in link buffer 111C, if the command buffer 111A is full.

Figure 2A:
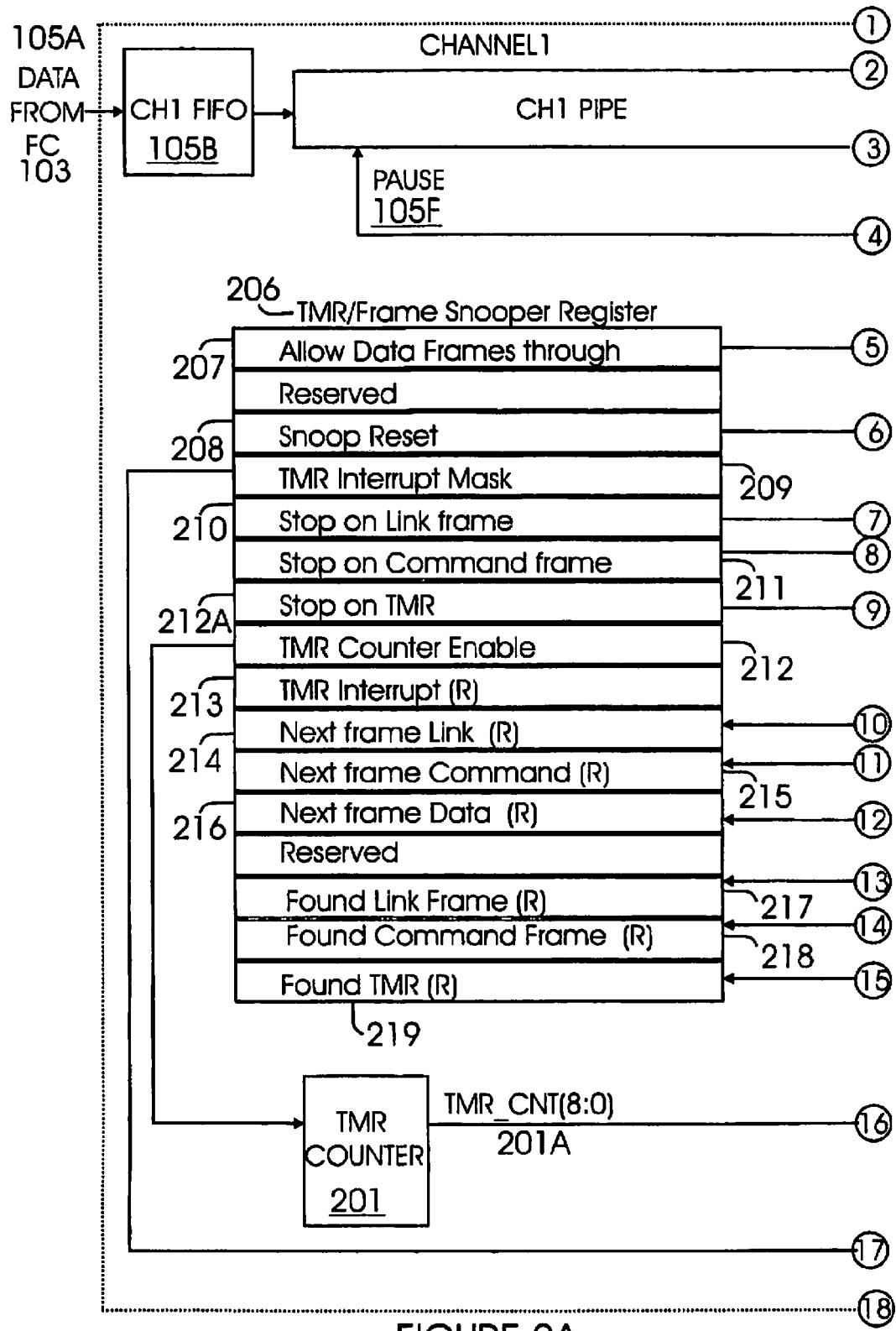
FIGS. 2A-2B (referred to as FIG. 2) show a block diagram of Channel 1, according to one aspect of the present invention.
Figure 2B:
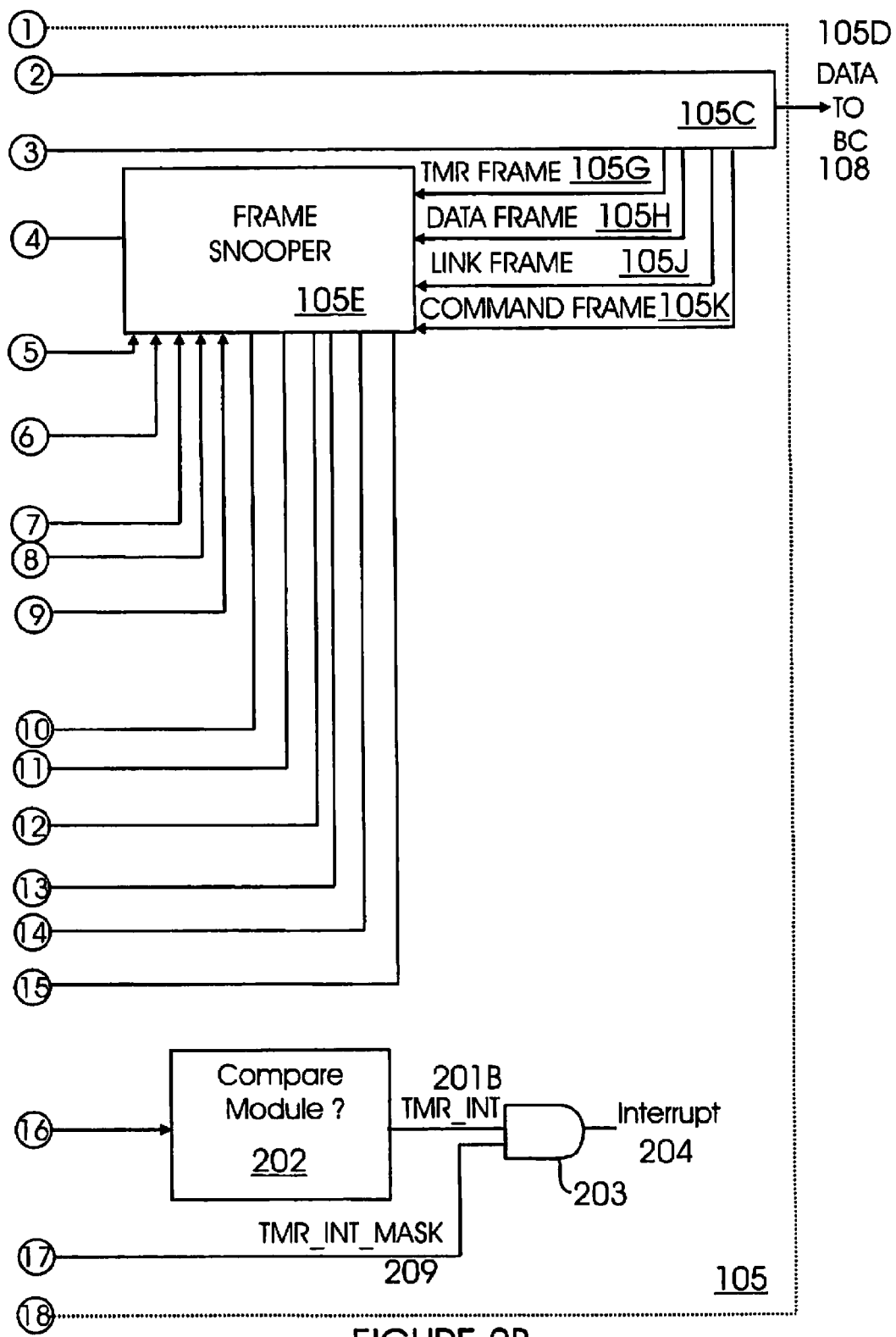

FIG. 2 shows a block diagram of CH1 105 logic for handling frames, according to one aspect of the present invention. Frames 105A from Fibre Channel I/F 103 are received by CH1 FIFO 105B, which is a first-in-first-out memory structure for holding the frames. CH1 pipe 105C is used to stage frames before they are moved to BC 108 (shown as 105D).

While frames are in CH1 pipe 105C, frame snooper module 105E detects the different types of frames. The frames are shown as command frame 105K, link frame 105J, data frame 105H and a TMR frame 105G. TMR frame 105G is detected by decoding the following values in a Fibre Channel Frame:

Field R CTL (defined by Fibre Channel standards)=6;
TYPE (Fibre Channel Standard defined field)=08; and
The payload byte 10 is equal to a non-zero value.

In one aspect of the present inventions, when frame snooper module 105E detects a command frame 105K, link frame 105J or a TMR frame 105G, then via signal 105F, the receive operation for other frames may be stopped. It is noteworthy that frame snooper module 105E may be configured to continue to receive data frames 105H after a stop "event" (i.e. receipt of command frame 105K, link frame 105J or a TMR frame 105G).

A TMR counter 201 is used to count all TMR frames 105G. In one aspect of the present invention, the TMR counter 201 may be 9-bits wide. It is noteworthy that other size counter(s) may also be used to count TMR frames and the present invention is not limited to any particular counter size.

TMR counter 201 is enabled by firmware using a TMR counter enable bit 212. The TMR count 201A is fed into a compare module 202. If count 201A is greater than a certain number then an interrupt is set (shown as 201B). Logic 203 is used to send an interrupt signal 204 to processor 100 via an interrupt pin/logic (not shown). TMR based interrupts may be masked by using a mask bit value 209 that is input to logic 203.

A register, shown as TMR/Frame snooper register 206 (may also be referred to as register 206) is used to store various bit values that are used to process frames, according to one aspect of the present invention. The following describes the various bit settings.

Allow Data Frames Through bit 207: When this bit is set, data frames are received and sent to buffer memory via CH 1 105, even after the Frame Snooper module 105E generates a pause signal/command 105F.

Snoop Reset bit 208: When this bit is set (for example, to 1), it creates a pulse that resets all snoop related hardware.

TMR Interrupt Mask bit 209: As discussed above, when this bit is set, the TMR interrupt is masked.

"Stop on Link Frame" bit 210: Setting this bit instructs the Frame Snooper module 105E to stop CH1 105 receive operations after a link frame has been sent to buffer memory 111.

"Stop on Command Frame" bit 211: Setting this bit instructs the Frame Snooper module 105E to stop CH1 105 receive operations after a command frame has been sent to buffer memory 111.

"Stop on TMR" 212A: Setting this bit instructs the Frame Snooper module to stop CH1 105 receive operations after a Command frame containing task management flag bits has been sent to buffer memory 111.

Task Management Counter Enable bit 212: When this bit is set, counter 201 will increment every time a TMR frame (105G) is received.

Task Management Request Interrupt 213: When this bit is set it denotes that a Task Management Request has been received.

Next Frame Link bit 214: If set, this bit indicates that the next Frame from CH1 FIFO 105B will be sent to a Link Buffer (shown in FIG. 1B for storing link frames).

Next Frame Command bit 215: If set, this bit indicates that the next frame from CH1 FIFO 105B will be sent to the Command Buffer.

Next Frame Data bit 216: If set, this bit indicates that the next frame from CH1 FIFO 105B will be sent to the Data Buffer.

Found Link Frame bit 217: If this bit is set, it indicates that the frame snooper module 105E stopped CH1 105 receive operations after a link frame was sent to buffer memory 111.

Found Command Frame bit 218: If this bit is set, it indicates that the frame snooper module 105E stopped CH1 105 receive operations after a command frame was sent to the buffer.

Found Task Management Request Frame bit 219: If this bit is set, it indicates that the frame snooper module 105E stopped CH1 105 receive operations after a 25 task management request frame was sent to buffer memory ill.

Figure 3:
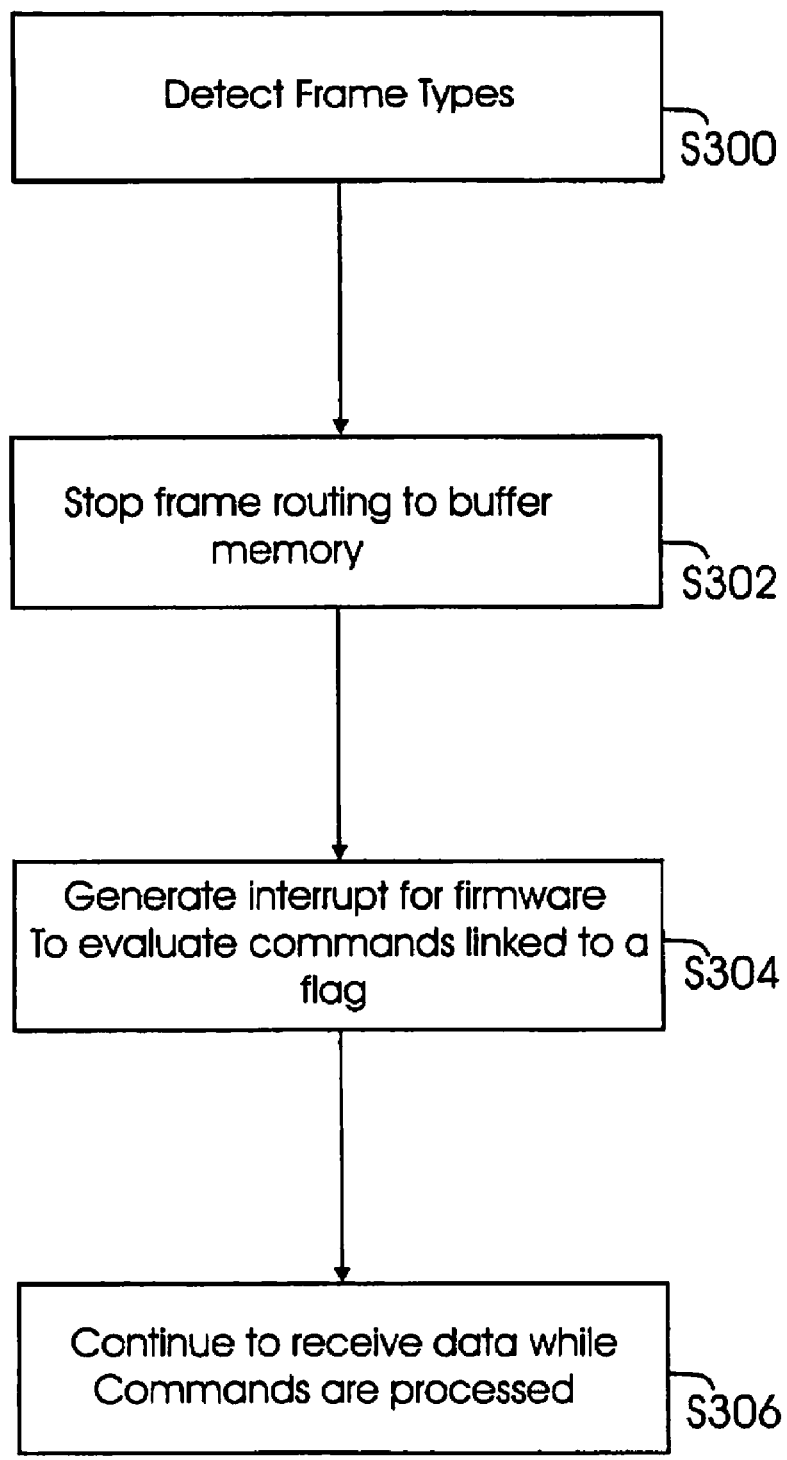
FIG. 3 is a process flow diagram for processing non-data frames, according to one aspect of the present invention.

FIG. 3 shows a process flow diagram for processing frames, according to one aspect of the present invention. The process assumes that various configuration bits, described above with respect to register 206 are set so that frame snooper module 105 can generate pause signal 105F to stop certain receive operations.

Turning in detail to FIG. 3, in step S300, frame snooper module 105E detects certain frame types. Frame types include command frame 105K, link frame 105J, data frame 105H and TMR frame 105G.

In step S302, a pause signal 105F is generated to stop CH1 pipe 105C to transmit frames to buffer memory 111 via BC 108. For example, if a "Stop on TMR frame" bit 212A is set then CH1 pipe 105C does not send any more frames to BC 108 after receiving a TMR.

In step S304, an interrupt is generated if a TMR frame 105G is received. It is noteworthy that firmware for controller 101 may generate an interrupt after a TMR counter 201 reaches a certain value.

In step S306, data frames are still received while CH1 pipe 105C stops sending command or link frames to BC 108, after the pause signal is generated in step S302.

Because receive operations stop when a TMR frame 105G is received, it allows processor 100 to complete the execution of previously received command frames. This is more efficient because a TMR 105G may request processor 100 to discard previously received command frame, or select certain command frames to execute in a certain order or priority. This improves performance and reduces latency. Also, no timers are needed to manage command frames.

Although the present invention has been described with reference to specific embodiments, these embodiments are illustrative only and not limiting. Many other applications and embodiments of the present invention will be apparent in light of this disclosure.

What is claimed is:

1. A storage drive system, comprising:
    an interface configured to i) receive frames from a host and ii) process the frames; and
    a channel configured to i) receive the frames from the interface and ii) transfer the frames from the interface to a buffer memory, the channel including
        a first register configured to store bit values corresponding to frame the processing of the frames, and
        a first module configured to i) detect frame types of the frames, and ii) in response to detecting a frame having a first frame type, stop receiving frames having a second frame type while selectively continuing to receive frames having a third frame type based on the bit values.

2. The storage drive system of claim 1, wherein the frame types correspond to at least one of: command frames, link frames, data frames, and task management request frames, wherein task management request frames are command frames that include task management flags.

3. The storage drive system of claim 1, wherein i) the first frame type corresponds to a task management request frame, ii) the second frame type corresponds to a command frame or a link frame, and iii) the third frame type corresponds to a data frame.

4. The storage drive system of claim 1, further comprising:
    a counter configured to count a first number of the frames having the first frame type; and
    a compare module configured to i) compare the first number to a predetermined number and ii) generate an interrupt based on the comparison.

5. The storage drive system of claim 4, further comprising logic configured to selectively mask the interrupt based on the bit values.

6. The storage drive system of claim 1, wherein the first module is configured to determine which frames of a particular frame type to stop receiving based on the bit values.

7. The storage drive system of claim 1, wherein the first module is configured to determine where in the buffer memory to store the frames based on the frame types of the frames.

8. The storage drive system of claim 1, wherein the interface is a fibre channel interface.

9. A method for operating storage drive system, the method comprising:
    receiving and processing frames from a host using an interface; and
    using channel logic,
        receiving the frames from the interface,
        transferring the frames from the interface to a buffer memory,
        storing bit values corresponding to the processing of the frames,
        detecting frame types of the frames, and
        in response to detecting a frame of a first frame type, stopping receiving frames of a second frame type while selectively continuing to receive frames of a third frame type based on the bit values.

10. The method of claim 9, wherein the frame types correspond to at least one of: command frames, link frames, data frames, and task management request frames, wherein task management request frames are command frames that include task management flags.

11. The method of claim 9, wherein i) the first frame type corresponds to a task management request frame, ii) the second frame type corresponds to a command frame or a link frame, and iii) the third frame type corresponds to a data frame.

12. The method of claim 9, further comprising:
    counting a first number of the frames having the first frame type;
    compare the first number to a predetermined number; and
    generating an interrupt based on the comparison.

13. The method of claim 12, further comprising selectively masking the interrupt based on the bit values.

14. The method of claim 9, further comprising determining which frames of a particular frame type to stop receiving based on the bit values.

15. The method of claim 9, further comprising determining where in the buffer memory to respectively store the frames based on the frame types of the frames.

16. The method of claim 9, wherein the interface is a fibre channel interface.

* * * * *